(12) United States Patent
Meidhof et al.

(10) Patent No.: US 11,925,915 B2
(45) Date of Patent: Mar. 12, 2024

(54) SQUEEZING-ROLL GRANULATOR, GRANULATING SYSTEM COMPRISING SAME, AND USE OF THE SQUEEZING-ROLL GRANULATOR

(71) Applicant: Maag Automatik GmbH, Grossostheim (DE)

(72) Inventors: Helmuth Meidhof, Grossostheim (DE); Stefan Dahlheimer, Kleinostheim (DE); Marco Nieder, Messel (DE)

(73) Assignee: Maag Automatik GmbH, Grossostheim (DE)

( * ) Notice: Subject to any disclaimer, the term of this patent is extended or adjusted under 35 U.S.C. 154(b) by 118 days.

(21) Appl. No.: 15/524,987

(22) PCT Filed: Nov. 4, 2015

(86) PCT No.: PCT/EP2015/002216
§ 371 (c)(1),
(2) Date: May 5, 2017

(87) PCT Pub. No.: WO2016/070994
PCT Pub. Date: May 12, 2016

(65) Prior Publication Data
US 2017/0320031 A1 Nov. 9, 2017

(30) Foreign Application Priority Data
Nov. 5, 2014 (DE) .......................... 202014008800.4

(51) Int. Cl.
*B01J 2/22* (2006.01)
*B29B 9/06* (2006.01)
(Continued)

(52) U.S. Cl.
CPC ................... *B01J 2/22* (2013.01); *B29B 9/06* (2013.01); *B29B 9/12* (2013.01); *B29C 48/0022* (2019.02);
(Continued)

(58) Field of Classification Search
CPC .................................. B01J 2/22; B29C 48/92
(Continued)

(56) References Cited

U.S. PATENT DOCUMENTS

| 1,543,506 | A | * | 6/1925 | Miller | ...................... B29C 65/74 |
| | | | | | 264/159 |
| 3,859,407 | A | * | 1/1975 | Blanding | ............... C03B 11/082 |
| | | | | | 241/3 |

(Continued)

FOREIGN PATENT DOCUMENTS

| CN | 1056508 C | 9/2000 |
| DE | 1297525 B | 6/1969 |

(Continued)

OTHER PUBLICATIONS

Machine Translation of WO 2014/127914 (Year: 2014).*
(Continued)

*Primary Examiner* — Russell E Sparks
(74) *Attorney, Agent, or Firm* — Farber LLC; Jonathan Winter

(57) ABSTRACT

A squeezing roller granulator that has a squeezing roller pair composed of a toothed pressure roller and a toothed squeezing roller. The teeth of the pressure roller and the squeezing roller have tooth flanks that are situated between a tooth root region and a tooth tip region. The tooth root region has an outer diameter that is smaller than the outer diameter of the tooth tip region, and the tooth tip region of at least one of the rollers of the squeezing roller pair has three squeezing zones including a middle squeezing zone, which define different (Continued)

distances between the tooth tip regions with a minimum distance in the region of the middle squeezing zone, and the contour of the tooth flanks and the tooth root region of the rollers of the squeezing roller pair defines a maximum cross-section of granulate cushions to be formed.

17 Claims, 7 Drawing Sheets

(51) Int. Cl.
| | |
|---|---|
| *B29B 9/12* | (2006.01) |
| *B29C 48/00* | (2019.01) |
| *B29C 48/04* | (2019.01) |
| *B29C 48/05* | (2019.01) |
| *B29C 48/16* | (2019.01) |
| *B29C 48/21* | (2019.01) |
| *B29C 48/30* | (2019.01) |
| *B29C 48/335* | (2019.01) |
| *B29C 48/88* | (2019.01) |
| *B29C 48/92* | (2019.01) |
| *B29K 101/12* | (2006.01) |
| *B29B 9/16* | (2006.01) |
| *B29K 91/00* | (2006.01) |

(52) U.S. Cl.
CPC .............. *B29C 48/04* (2019.02); *B29C 48/05* (2019.02); *B29C 48/16* (2019.02); *B29C 48/21* (2019.02); *B29C 48/304* (2019.02); *B29C 48/335* (2019.02); *B29C 48/919* (2019.02); *B29C 48/92* (2019.02); *B29B 2009/163* (2013.01); *B29C 48/0011* (2019.02); *B29C 2948/92428* (2019.02); *B29C 2948/9259* (2019.02); *B29C 2948/926* (2019.02); *B29C 2948/92704* (2019.02); *B29C 2948/92876* (2019.02); *B29C 2948/92923* (2019.02); *B29C 2948/92933* (2019.02); *B29C 2948/92971* (2019.02); *B29K 2091/00* (2013.01); *B29K 2101/12* (2013.01)

(58) Field of Classification Search
USPC ......................................................... 264/15
See application file for complete search history.

(56) References Cited

U.S. PATENT DOCUMENTS

| | | | | |
|---|---|---|---|---|
| 3,902,676 A * | 9/1975 | Sartori | ............... | B65H 54/2893 |
| | | | | 242/483.5 |
| 4,028,024 A | 6/1977 | Moreland | | |
| 4,219,291 A * | 8/1980 | Hoeh | .................... | B02C 18/182 |
| | | | | 407/31 |
| 4,261,706 A * | 4/1981 | Blanding | .................. | B01J 2/22 |
| | | | | 264/122 |
| 4,424,016 A * | 1/1984 | Matsuda | ............... | B30B 11/006 |
| | | | | 425/162 |
| 4,976,907 A * | 12/1990 | Brotz | ......................... | B29B 9/10 |
| | | | | 264/117 |
| 6,120,802 A * | 9/2000 | Breitenbach | .............. | A61J 3/10 |
| | | | | 424/464 |
| 6,312,225 B1 | 11/2001 | Bussard | | |
| 6,591,585 B2 * | 7/2003 | Stolz | ......................... | A61J 3/07 |
| | | | | 53/454 |
| 2016/0046040 A1 * | 2/2016 | Dahlheimer | ............ | B29C 48/92 |
| | | | | 425/202 |

FOREIGN PATENT DOCUMENTS

| | | | | |
|---|---|---|---|---|
| DE | 1533827 | B1 | 10/1971 | |
| DE | 2627263 | B1 | 12/1977 | |
| DE | 3145614 | C2 | 6/1984 | |
| DE | 3622053 | A1 | 1/1987 | |
| DE | 3832566 | A1 | 4/1990 | |
| DE | 4125826 | A1 * | 4/1993 | ............... B01J 2/12 |
| DE | 10347908 | A1 | 5/2005 | |
| DE | 102007016347 | A1 | 10/2008 | |
| DE | 102012008564 | A1 | 10/2013 | |
| EP | 0143414 | A2 | 6/1985 | |
| EP | 0240906 | A2 | 10/1987 | |
| EP | 1772250 | A1 | 4/2007 | |
| GB | 1181874 | A | 2/1970 | |
| JP | S5981120 | A | 2/1984 | |
| SU | 1180061 | A1 * | 9/1985 | ............... B29B 9/06 |
| WO | 2014127914 | A1 | 8/2014 | |

OTHER PUBLICATIONS

Machine Translation of JP 5981120 (Year: 1984).*
Pellet Mill for Wood, Gemco Energy, http://www.gemcopelletmill.com/pellet-mill-for-wood.html (Year: 2013).*
United States Corut of Appeals for the Federal Circuit Opinion in in re Chudik (Appeal No. 2016-1487) (Year: 2017).*
In re Chudik, 851 F.3d 1365 (Fed. Cir. 2017) (Year: 2017).*
Machine Translation of SU 1180061 (Year: 1985).*
Machine Translation of DE 4125826 (Year: 2023).*
Food Factory Machinery and Equipment, XueQin Xu, p. 287-288, China Licllt Industry Press, Jan. 31, 2008.
Powder Engineering, Yang Jiang et al., p. 250-251, Wuhan University of Technology Press, Dec. 31, 2008.
Korean Office Action dated Mar. 26, 2021 issued in Korean Application No. 10-2017-7015150 (with translation).

* cited by examiner

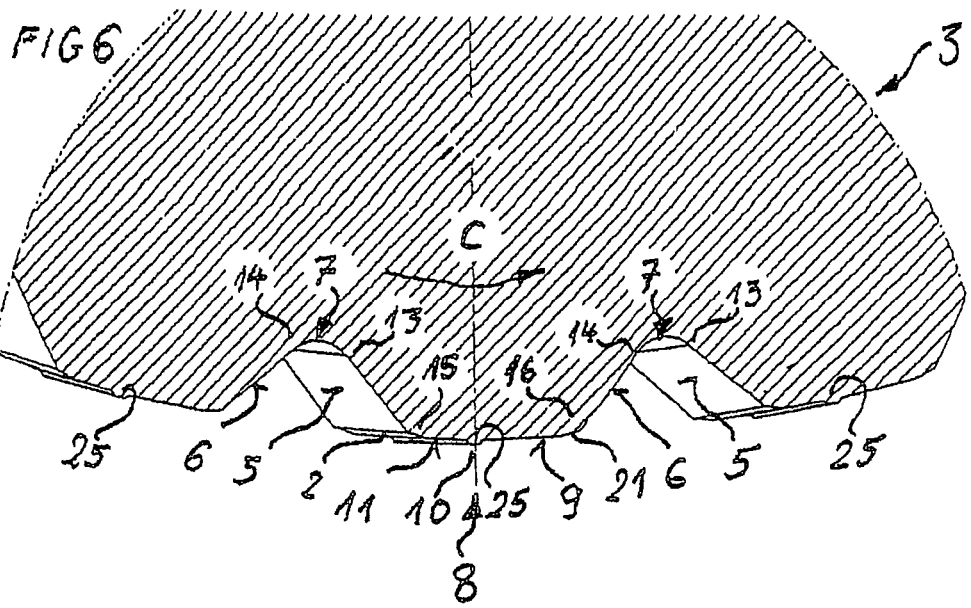
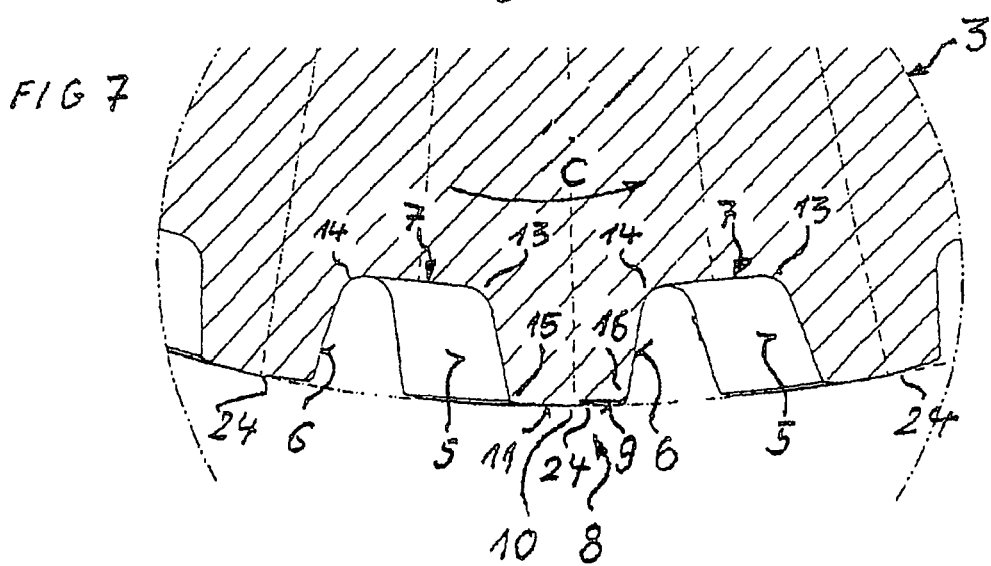
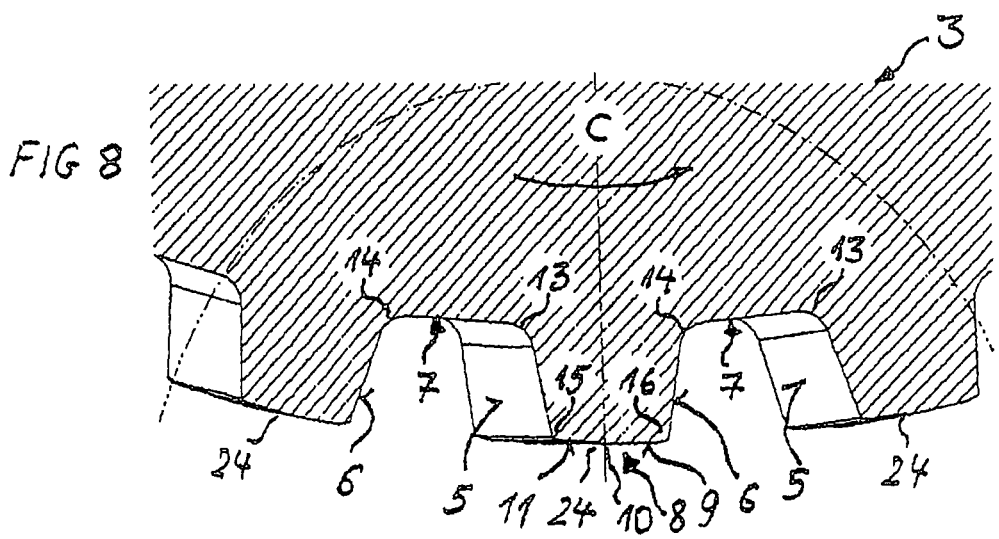

FIG 9
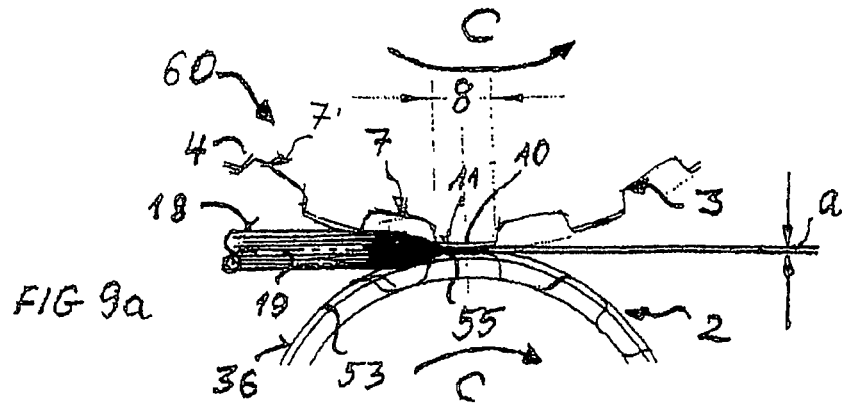
FIG 9a
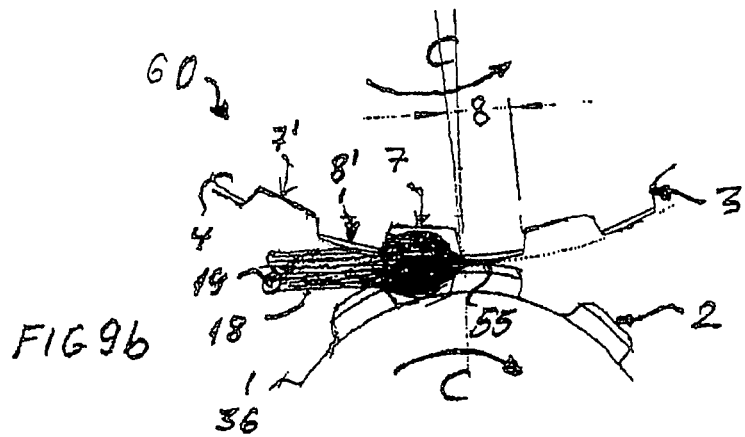
FIG 9b
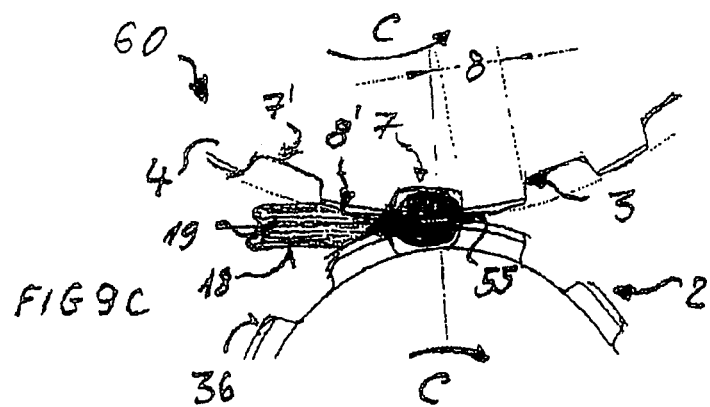
FIG 9c

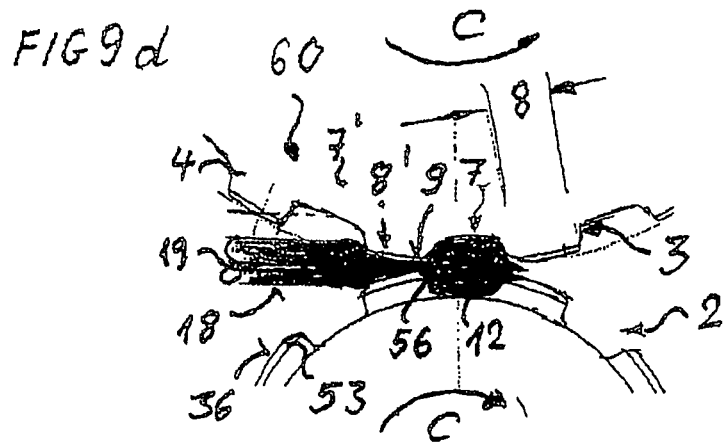
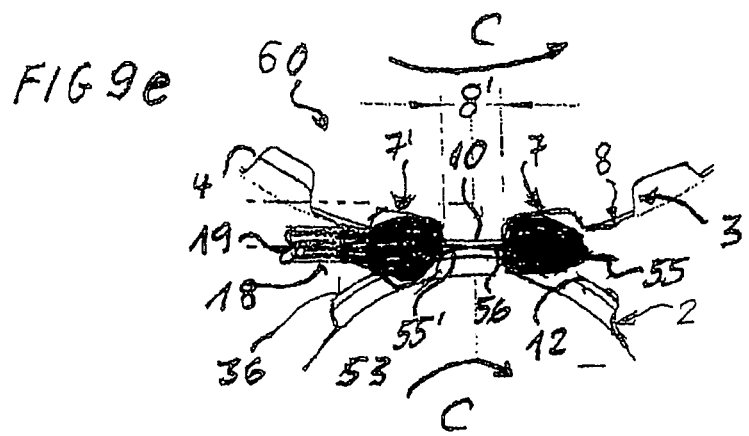
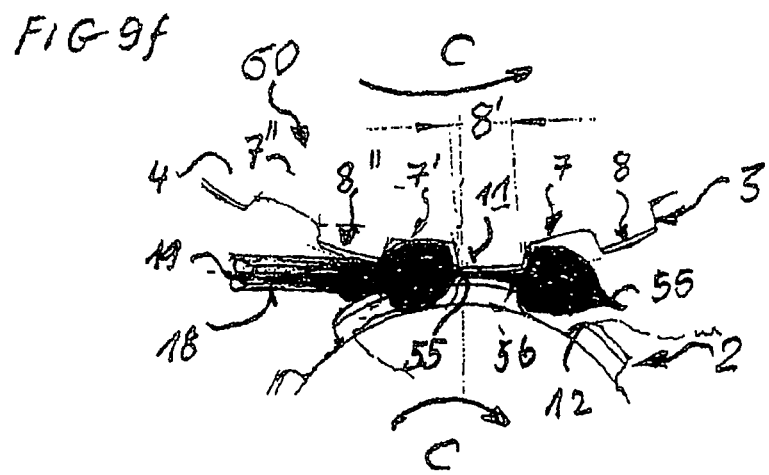

SQUEEZING-ROLL GRANULATOR, GRANULATING SYSTEM COMPRISING SAME, AND USE OF THE SQUEEZING-ROLL GRANULATOR

FIELD OF THE INVENTION

The invention relates to a squeezing roller granulator with a squeezing roller pair, which has a toothed pressure roller and a toothed squeezing roller; the teeth of the pressure roller and the squeezing roller have tooth flanks that are situated between a tooth root region and a tooth tip region, and the tooth root region has an outer diameter that is smaller than the outer diameter of the tooth tip region.

BACKGROUND OF THE INVENTION

Such a device of a squeezing roller granulator for granulating strands of plastic material and similar plastic masses is known from German patent disclosure DE 31 45 614 C2; the strands of plastic material and similar plastic masses are referred to below as plastic strands, particularly when they have a covering tube with an enclosed filling. The known squeezing roller device has a feeder device for at least one externally hardened strand, which guides the strand to a roller pair that can be driven in opposite directions around parallel axes. At least one roller of the roller pair is made of a material that is hard compared to the plastic material and has projections extending in an essentially axial direction distributed over its circumference. Radially outer ends of the squeezing roller cooperate with a smooth, cylindrical surface of the pressure roller. In this case, the radially outer surface regions of the projections should almost come to rest against the pressure roller so that in this position, the roller is held at a stop with a prestressing force and the plastic material of the plastic strand is broken down into granulate.

A disadvantage of this device is that it is not able to produce granulate cushions out of covering bags with a filler, as required in many variations for different applications.

For this need, the German patent disclosures DE 103 47 908 A1 and DE 38 32 566 C2 and the published, examined German patent disclosure DE 1 297 525 A have disclosed methods and devices that use a coextrusion method in order to produce a multi-layer plastic container out of tubular coextruded plastic materials, which are formed into containers; a filling mandrel makes it possible, after the container has been coextruded, to introduce a filler into the coextruded and molded container.

The disadvantage of such devices that enable coextruded containers to be subsequently filled by means of a filling mandrel is the complex design of the device used for molding coextruded containers, then incrementally filling the containers by means of a filling mandrel, and subsequently closing the container. Also because of the relatively complex filling process, an economically viable production is only possible starting from a certain container size.

In addition, German patent disclosure DE 36 22 053 A1 has disclosed a compacting unit, which has a pair of compacting rollers. The compacting rollers have alternating circumferential protrusions in order to produce forming paths between themselves and the scraper. The scraper rests against an outlet side of the compacting rollers, is oriented toward the forming paths, and can be moved away from them. It is thus possible to open and close the forming paths. In addition, the compacting unit has a feeder element with a throat part that tapers toward the bottom, whose inner circumference wall is approximately in contact with the outer surfaces. For this purpose, the two compacting rollers have respective toothed surfaces that are situated opposite from each other, with cutting rods or cutting teeth that taper to a point, but that do not have a pronounced tooth tip region.

SUMMARY OF THE INVENTION

The object of the present invention is to create a squeezing roller granulator with a squeezing roller pair, which is able to produce and seal granulate cushions, which have a covering with a portioned filler.

This object is attained according to the invention by means of a squeezing roller granulator. Preferred embodiments of the invention are defined in the dependent claims.

One embodiment of the squeezing roller granulator according to the invention has a squeezing roller pair composed of a toothed pressure roller and a toothed squeezing roller; the teeth have tooth flanks that are situated between a tooth root region and a tooth tip region; the tooth root region has an outer diameter, which is smaller than the outer diameter of the tooth tip region; and in the tooth tip region, at least one of the rollers of the squeezing roller pair has three squeezing zones with a middle squeezing zone, which zones define different distances from the cylindrical pressure roller, with a minimum distance in the region of the middle squeezing zone; and the contour of the tooth flanks and that of the tooth root region of the rollers of the squeezing roller pair define a maximum cross-section of granulate cushions to be produced; and the maximum filling volume also depends on the width to which the granulate cushions are squeezed.

The advantage of the squeezing roller granulator according to the invention is that with a single squeezing roller rotation, it is able to enclose a large number of filler portions into granulate cushions and seal them in a media-tight fashion, which was not possible with the previously known squeezing roller granulator, which merely cuts pre-hardened strands into plastic granulates. In addition, the devices known from the above-cited publications for coextruding multilayer containers, filling the containers by means of a filling mandrel, and subsequently closing the containers are not able to enclose precisely portioned amounts of filler in an outer covering in a media-tight fashion on a mass-production scale. Another advantage as compared to squeezing roller granulators that have only a single toothed squeezing roller lies in the fact that with the squeezing roller granulator according to the invention, practically twice as much filler can be enclosed in each granulate cushion. Furthermore, it is thus also relatively easily possible to produce granulate cushions that are symmetrically shaped or essentially symmetrically shaped in the longitudinal cross-section; it is particularly preferable for the corresponding upper and lower envelope curves to be embodied as symmetrical.

In another embodiment of the invention, the tooth root region extends from one end of a falling tooth flank to a beginning of a rising tooth flank and the tooth tip region correspondingly extends from one end of a rising tooth flank to a beginning of a falling tooth flank. The three squeezing zones of the tooth tip region include an incoming squeezing zone, which is situated toward an infeed side, an outgoing squeezing zone, which is situated toward an outflow side, and the middle squeezing zone, which is situated between the incoming and outgoing squeezing zones. In this connection, the incoming and outgoing squeezing zones of the teeth are delimited by the tooth flanks. In addition, the incoming squeezing zone defines a distance between the rollers of the squeezing roller pair that decreases in the direction toward the middle squeezing zone and the outgoing squeezing zone defines a distance between the rollers of the squeezing roller pair that increases starting from the middle squeezing zone.

This embodiment is connected with the advantage that as the surfaces of the tooth tip regions of the rollers of the squeezing roller pair roll against one another, the filler of a supplied covering tube filled with fillers can be displaced so that in the incoming squeezing zone, a media-tight welding of the covering material to an incoming sealing seam occurs and the same thing also occurs in outgoing squeezing zones of the tooth tip region, in which media-tight outgoing sealing seams are produced. In the middle squeezing zone, which has a minimum distance between the tooth tip regions of the rollers of the squeezing roller pair, an intended breaking point profile is produced at which adjoining granulate cushions can be disconnected from one another.

In one embodiment, only one of the rollers of the squeezing roller pair can have the three squeezing zones in the tooth tip region, whereas the other one of the two rollers of the squeezing roller pair respectively has a smooth, cylindrically rounded tooth tip region. This has the advantage that slight deviations from a synchronous operation of the two squeezing rollers can be tolerated.

Alternatively, both of the squeezing rollers of the squeezing roller pair have the three squeezing zones in their tooth tip regions; this has the advantage that with an exact synchronization of the rotations of the two squeezing rollers, the wear on each squeezing roller can be reduced, thus prolonging the trouble-free operating time of the squeezing roller granulator. This can also facilitate the adjustment of definite gap dimensions between the squeezing rollers.

For this purpose, in another embodiment of the invention, the squeezing roller granulator has a synchronizing device, which synchronizes the rotation of the squeezing roller pair so that the tooth tip regions are situated opposite one another during a squeezing procedure. This synchronizing device can have two meshing gears, which are mounted on the shafts of the squeezing rollers, as shown in FIG. 3. Alternatively, it is also possible for reciprocally acting toothed belts to mesh with correspondingly embodied toothed belt pulleys. On the other hand, it is also possible to provide a rotation direction-reversing transmission with a transmission ratio of 1:1 between the shafts of the squeezing rollers.

It is also possible for there to be an embodiment of the invention in which the respective squeezing rollers are driven by means of respective individual drive units that are correspondingly synchronized. Such individual drive units are intrinsically known, for example, from U.S. Pat. No. 6,312,225.

In addition, in another embodiment of the invention, the squeezing roller granulator has a feeder device for supplying a covering tube with coextruded filler. The squeezing roller granulator according to the invention is therefore not only able to produce a multilayered construction of an outer covering through coextrusion of covering materials, but also primarily, for a preferably single-layer covering tube that is coextruded together with a filler, a device is produced that is able to fill granulate cushions and simultaneously seal them in a media-tight fashion in the squeezing roller pair composed of the toothed pressure roller and toothed squeezing roller with the special embodiment of the tooth tip region in three squeezing zones. In addition, the granulate cushions have portions of the filler that are enclosed by an outer covering composed of the material of the covering tube.

One advantage of a squeezing roller granulator of this kind with an extruded covering tube and the coextruded filler enclosed in the covering tube is that it achieves a mass flow rate and output of granulate cushions that cannot be achieved with conventional systems for producing and filling containers.

In particular, it is thus also possible according to the invention to produce relatively small granulate cushions with a volume of less than 1 cm$^3$, for example.

In order to further improve the production of sealing seams, in another embodiment of the invention, the tooth tip region has a beveled incoming edge leading into the incoming squeezing zone and a beveled outgoing edge leading from the outgoing squeezing zone. This bevel provided at the incoming edge and outgoing edge improves the formation of sealing seams in that it prevents the extruded covering tube with coextruded filler from being damaged by the incoming edges or outgoing edges of the squeezing zones.

In another embodiment of the invention, the middle squeezing zone of the tooth tip region has a flattened region serving as an intended breaking point profile. This flattened region, which is spaced a minimum distance from the surrounding cylinder surface of the pressure roller there, makes it possible to produce an intended breaking point seam of minimal thickness between two granulate cushions that are attached to each other.

In another embodiment of the invention, the middle squeezing zone of the tooth tip region has a step serving as an intended breaking point profile. Such a step, with a minimum distance between the rollers of the squeezing roller pair, functions like a cutting edge so that with an extremely slight load, this intended breaking point seam is suitable for detaching the attached granulate cushions from one another.

In addition, the middle squeezing zone of the tooth tip region has a rib cross-section protruding out beyond the incoming squeezing zone and outgoing squeezing zone. Such a rib cross-section additionally reduces the distance between the rollers of the squeezing roller pair so that in this embodiment as well, the middle squeezing zone can function as a cutting knife, which makes it possible to detach the granulate cushions from one another, even with only a slight load on the intended breaking point seam.

In addition, the outgoing squeezing zone is longer than the incoming squeezing zone. This yields the advantage that the outgoing squeezing seam is wider or longer than the incoming squeezing seam, thus significantly reducing the risk of damage to the outgoing sealing seam when a granulate cushion is detached from a subsequent granulate cushion while the squeezing phase of the squeezing roller is still happening.

In addition, the rollers of the squeezing roller pair have a metal alloy; the surfaces of the tooth tip regions have wear-resistant surfaces, preferably surfaces with hard metal coatings or ceramic coatings or hardened surfaces. A hardening of the surfaces and/or of the tooth tip regions is preferably achieved by means of an inductive hardening process in which the surfaces of the tooth tip regions are inductively heated and then allowed to cool. On the other hand, it is also possible to achieve an improved hardness by providing hard metal coatings or ceramic coatings such as nitride or carbide layers on the surfaces. The harder the surfaces are embodied to be, the more precisely the different distances of the three squeezing zones between the granulate cushions can be embodied.

For the extruded covering tube, it is advantageous to use thermo-plastic plastics from the group including polyamide (PA), polypropylene (PP), low-density polyethylene (LDPE), copolymer (COP) or ethylene-vinyl alcohol copolymer (EVOH), ethylene-vinyl acetate copolymer (EVA), and mixed products thereof, which contain percentages of polyolefin waxes, polyethylene waxes, polypropylene waxes, or fatty acid derivatives, since covering tubes contain not just a single material, but a plurality of materials, which for example permit an increased protection from moisture and can be attached to one another by coextrusion to produce a multilayered covering tube.

If more than just one tooth tip region across the width B of the squeezing roller is spaced the minimum distance apart from the cylindrical pressure roller, then this can be achieved by means of a factor, preferably such as 5, so that a preferred range of the helix angle α lies between arctan π$D/nB$≤α≤5 arctan π$D/nB$.

In addition, the maximum dimensions of the granulate cushions depend on the geometry of the teeth and the width of the squeezing roller so that for the length l, a quotient is calculated based on π$D/n$ and for the width b of the granulate cushions on the one hand, a quotient of B/N is definitive, where B is the width of the squeezing roller and N is the number of parallel covering tubes with coextruded filler that are supplied to the squeezing roller, and on the other hand, the outer diameter d of the covering tube with which a width b of the granulate cushion of $b=\pi d/2$ can be achieved.

Another embodiment of the invention relates to a granulation system with a squeezing roller granulator; the granulation system has an extrusion device for coextruding fillers contained in covering tubes into plastic strands. The granulation system also has the squeezing roller granulator with a feeder device for supplying the plastic strands to a squeezing roller pair composed of a toothed pressure roller and a toothed squeezing roller and has a collecting device for collecting the plastic strands that have been portioned into granulate cushions by the squeezing roller pair; the granulate cushions have an outer covering, which is filled with a filler. Finally, a control and regulating device of the granulation system in this embodiment coordinates the drive unit of the squeezing roller with the extrusion speed of the plastic strands, and a synchronizing device synchronizes the rotation of the squeezing roller pair so that the tooth tip regions are situated opposite one another during a squeezing procedure.

Such a granulation system has the advantage that the feeding of the covering tubes with filler in the form of a plastic strand can be adapted to the extrusion speed of an associated extrusion device by means of the drive unit of the squeezing roller, with synchronization of the synchronizing device in all operating phases. At the outlet of the extrusion device and extending to the intake nip of the squeezing roller pair, it is thus possible to provide a relatively short connecting piece, for example in the form of a glide path that adjusts the temperature of the plastic strand.

On this glide path, it is possible to adjust the temperature of a plurality of parallel-extruded plastic strands to a processing temperature that is required for a compression of the covering tube in order to produce incoming sealing seams in the region of the incoming squeezing zone and outgoing sealing seams in the outgoing squeezing zone. This optimized processing temperature can be produced by introducing temperature-adjusted water into the feeder device or through corresponding optimization of the temperature adjustment of the squeezing roller pair. It is also possible to convey the parallel extending strands in a supply path through a correspondingly temperature-adjusted water bath. In this case, an easy-to-control exposure time can also be adjusted as a function of the supply speed that is set by means of the feeder device.

With short supply paths between the extrusion device and the squeezing roller pair, the water bath can be used to cool the plastic strands to the required welding temperature during the squeezing process, while with long supply paths from the extrusion device to the squeezing rollers, it is possible to provide a heating, for example by means of a water bath, to the processing temperature for welding, e.g. 40° C. In addition to a suitable processing temperature, a media-tight welding also depends on the contact pressure, the softening temperature of the sleeve material, the material thickness, and the exposure time to welding conditions in the temperature-controlled zone.

A preferred use of the squeezing roller granulator, as described above, is the production of granulate cushions with powdered, liquid, highly viscous, or plastically deformable fillers. In this connection, the squeezing roller granulator according to the invention is used for portioning pharmaceutical, medicinal, cosmetic, or adhesive fillers—or those that must be packed under sterile conditions—into granulate cushions with outer coverings composed of thermoplastically deformable plastics, with or without percentages of waxes. Adhesive fillers preferably in the form of hot melt adhesives can be portioned into granulate cushions. As the material for the outer coverings for enclosing the hot-melt adhesive, a material can be used that forms an outer surface of the granulate cushion, which is not adhesive.

BRIEF DESCRIPTION OF THE DRAWINGS

The invention will be described in greater detail below in conjunction with embodiments that are explained by way of example.

FIG. 6 shows an alternative schematic contour of a tooth tip region of one of the rollers of the squeezing roller pair;

FIG. 7 shows another modification of the contour of the tooth tip region of one of the rollers of the squeezing roller pair;

FIG. 8 shows another alternative of the contour of the tooth tip region of one of the rollers of the squeezing roller pair;

FIGS. 9a-9f show production phases in a tooth tip region of a squeezing roller pair composed of a toothed pressure roller and a toothed squeezing roller.

DETAILED DESCRIPTION OF THE INVENTION

Figure 1:
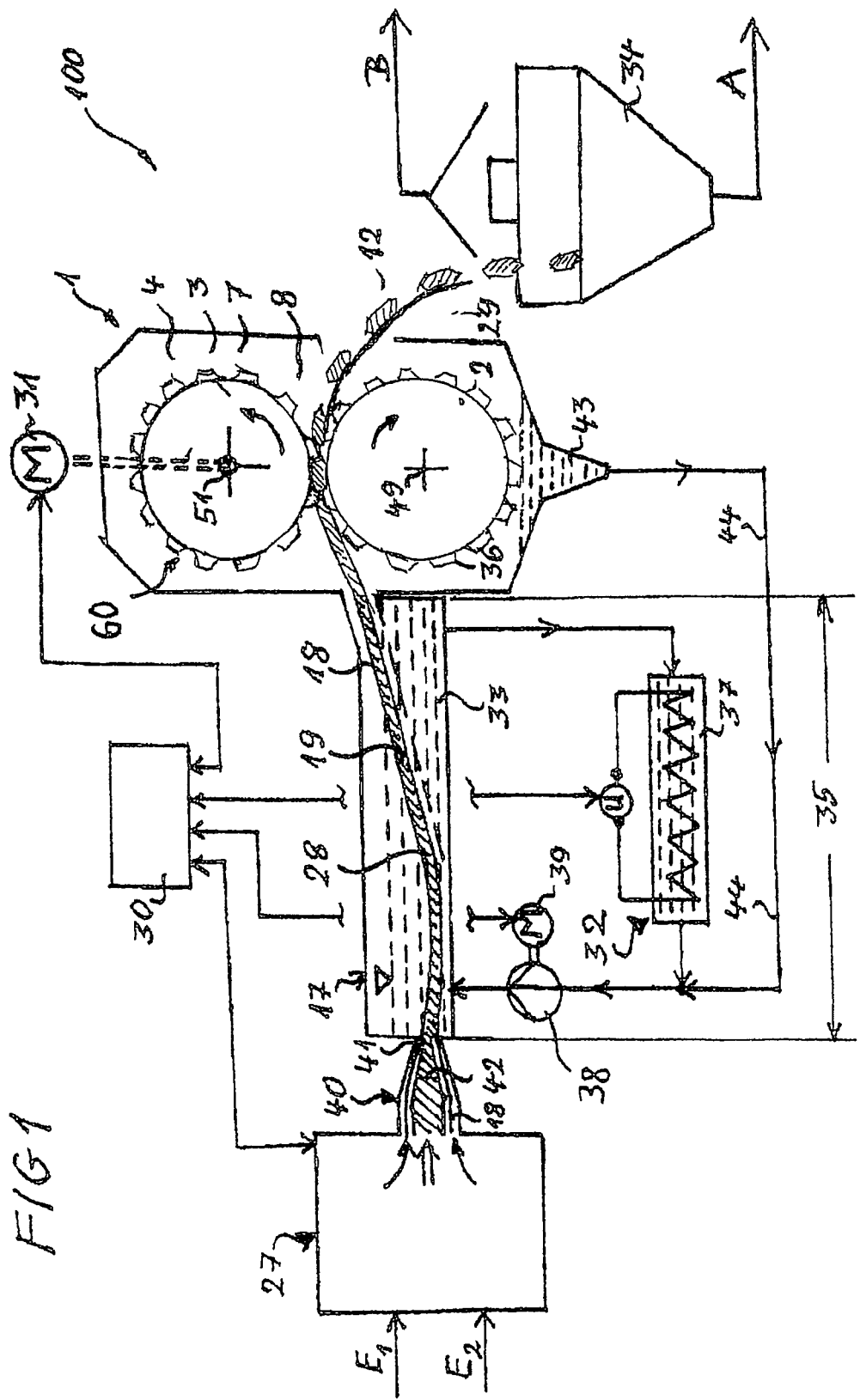
FIG. 1 shows a schematic diagram of a squeezing granulator in a granulation system for producing granulate cushions.

FIG. 1 shows a schematic diagram of a squeezing granulator 1 in a granulation system 100 for producing granulate cushions 12. The granulation system 100 has an extrusion device 27, a supply path 35, and the squeezing granulator 1.

The extrusion device 27 coextrudes a filler 19 in a covering tube 18 into a plastic strand 28. The temperature of this plastic strand 28 is adjusted in a feeder device 17 on a supply path 35 and supplied to the squeezing granulator 1.

The squeezing granulator 1 essentially has a pressure roller 2 and a toothed squeezing roller 3, which is driven by a drive unit 31. The squeezing roller 3 rolls with its teeth 4 on a surface 36 of the pressure roller 2 so that by forming a minimum distance a, granulate cushions 12 composed of a covering tube 18 are portioned with a coextruded filler 19.

The filled granulate cushions 12 are supplied by a collecting device 29 to a drying device 34, from which the dried and filled granulate cushions 12 are dispensed in the direction of arrow A and the moisture-laden air is conveyed out in the direction of arrow B in the manner of a cyclone liquid separator.

In the feeder device 17, a temperature adjusting device 32 is situated on the supply path 35 and makes it possible to adjust the temperature of the covering tube 18 by means of a water bath 33 through which the plastic strand 28 is conveyed. The temperature, which the covering tube 18 composed of a thermoplastic material should assume, is used to produce a welded seam in a nip between a tooth tip region 8 of the squeezing roller 3 and the surface 36 of the pressure roller 2. The tooth tip region 8 has a middle squeezing zone, which has a minimum distance a from the pressure roller 2 and is embodied in such a way that in the middle squeezing zone, an intended breaking point profile is formed between media-tight welded seams of the covering tube 18 so that it is possible to detach the granulate cushions 12 that are produced from an outer covering and a filler.

The temperature adjusting device 32 for adjusting the temperature of the water bath 33 has a heat exchanger 37, which supplies the necessary cooling or heating energy in order to adjust the temperature of the water bath 33; a pump 38 driven by a motor 39 maintains the circulation between the water bath 33 and the heat exchanger 37.

In order to supply the extrusion device 27 with the material for the covering tube 18, the extrusion device has an inlet $E_1$, while the filler material is supplied via the inlet $E_2$ of the extrusion device 27. The outlet of the extrusion device 27 is provided with a coextrusion nozzle 40, which has an annular gap 41 for extruding a covering tube 18. The filler material 19 can be coextruded in the center 42 of the coextrusion nozzle 40. Such a filler material can be supplied in powdered, liquid, or molten form to the coextrusion nozzle 40 via the inlet $E_2$. Preferably, a molten adhesive is coextruded as the filler material 19.

The granulation system 100 shown in FIG. 1 also has a control and regulating unit 30, which coordinates the drive unit 31 of the squeezing roller 3 with the extrusion speed of the extrusion device 27 and simultaneously regulates the temperature adjustment of the plastic strand 28 in the region of the supply path 35 of the feeder device 17.

The temperature-adjusting water can also be supplied via supply lines, not shown, to the squeezing roller 3 in order to control the temperature of the squeezing roller and via a water outlet 43 of the squeezing granulator 1, can be conveyed back into the temperature-adjusting water circuit via the return line 44.

Instead of the collecting device 29 shown here for the granulate cushions 12 that are supplied by the collecting device 29 to the drying device, the granulate cushions 12 can also be guided in a system of tubes with a flow of water to a water separator, not shown, and then to the drying device 34 shown here.

Figure 2:
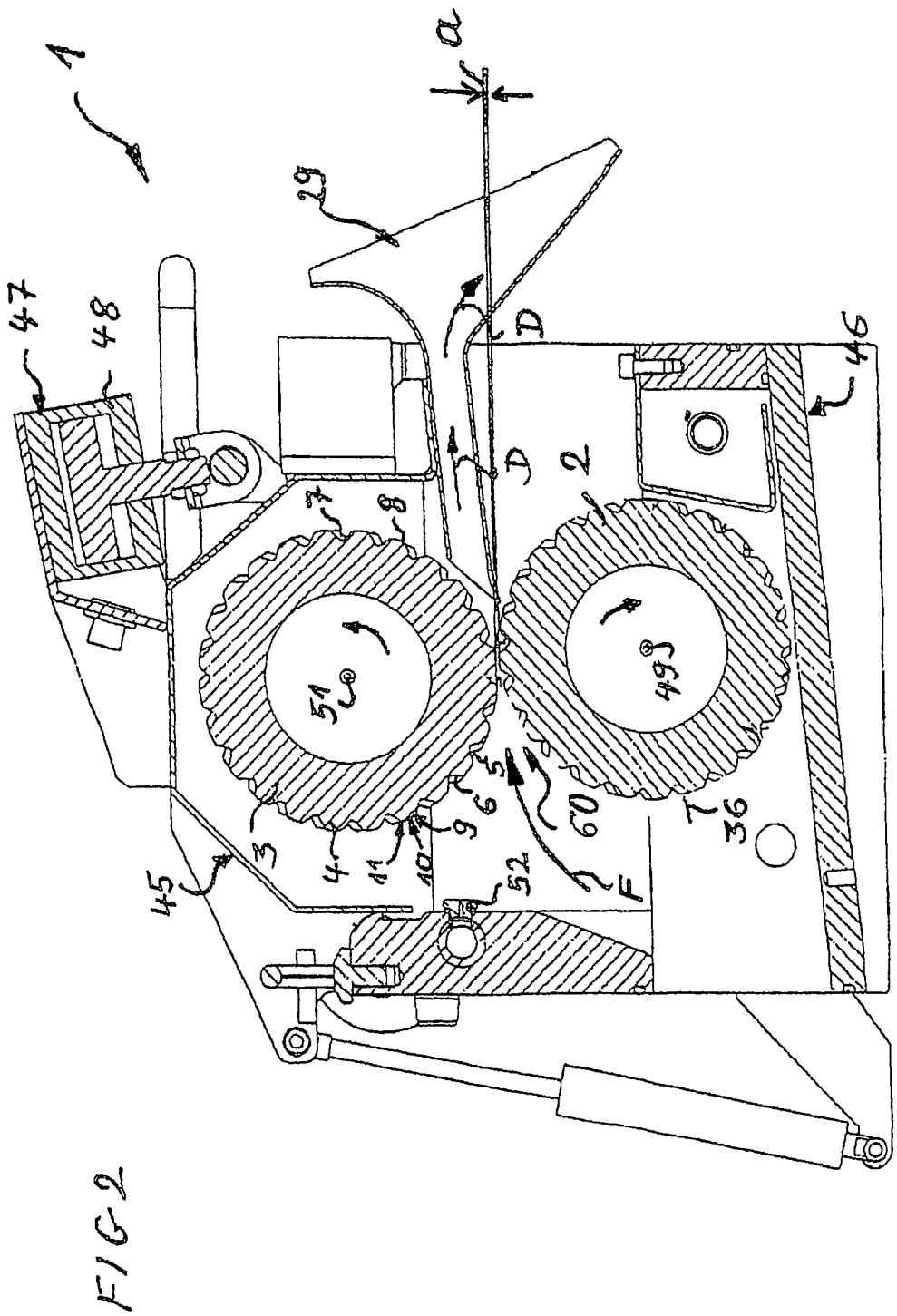
FIG. 2 shows a schematic cross-section through a section of a squeezing granulator.

FIG. 2 shows a schematic cross-section through a squeezing granulator 1. The squeezing granulator 1 has two housing halves 45 and 46, with an upper housing half 45 arranged in pivoting fashion relative to a lower housing half 46. The lower housing half 46 here can be positioned on a machine frame. The cylindrical pressure roller 2 is supported in rotary fashion in the lower housing half 46 while the driven squeezing roller 3 provided with teeth 4 is contained in the upper housing half 45.

In addition, the upper housing half 45 has a pressing mechanism 47 with which—in the closed state of the housing—the squeezing roller 3 can be varied relative to the pressure roller 2 by changing a minimum distance a or by changing a contact pressure between the cylindrical surface 36 of the pressure roller 2 and the tooth tip regions 8 of the squeezing roller 3 by means of a hydraulic or pneumatic cylinder 48. By means of the pressing mechanism 47, the squeezing regions and their possible squeezing thickness can be adapted to the respective material of the covering tube for an optimal production of sealing seams and intended breaking point profiles. Instead of the hydraulic or pneumatic cylinder 48, an electromechanical actuator can also be used.

The axes 49 and 51 of the pressure roller 2 and squeezing roller 3 are supported in an axially parallel fashion in the housing halves 45 and 46. The squeezing roller 3 has teeth 4 that have a tooth root region 7 and a tooth tip region 8. The tooth tip region 8 has three squeezing zones 9, 10 and 11, as shown in detail in the rest of the figures. The squeezing zones 9, 10 and 11 have an incoming squeezing zone 9, a middle squeezing zone 10, and an outgoing squeezing zone 11. The middle squeezing zone 10 is situated between the incoming squeezing zone 9 and the outgoing squeezing zone 11 and defines the minimum distance a between the squeezing roller 3 and the pressure roller 2 with a static pressing mechanism 47. This minimum distance depends on the corresponding contact pressure between the middle squeezing zone 10 and the cylindrical surface of the pressure roller, the processing temperature, and the material properties such as material thickness and plasticity at the processing temperature.

This cross-section through the squeezing granulator 1 also shows a collecting hopper of the collecting device 29, which conveys the granulate cushions shown in FIG. 1 in the direction of arrow D when corresponding plastic strands composed of a covering tube and a filler are supplied in the direction of arrow F to the squeezing roller pair 60 in the nip region. In addition, the lower housing half 46 contains a water jet nozzle 52 that aims temperature-adjusted water at the squeezing nip in order to assist the welding process in the production of sealing seams.

Figure 3:
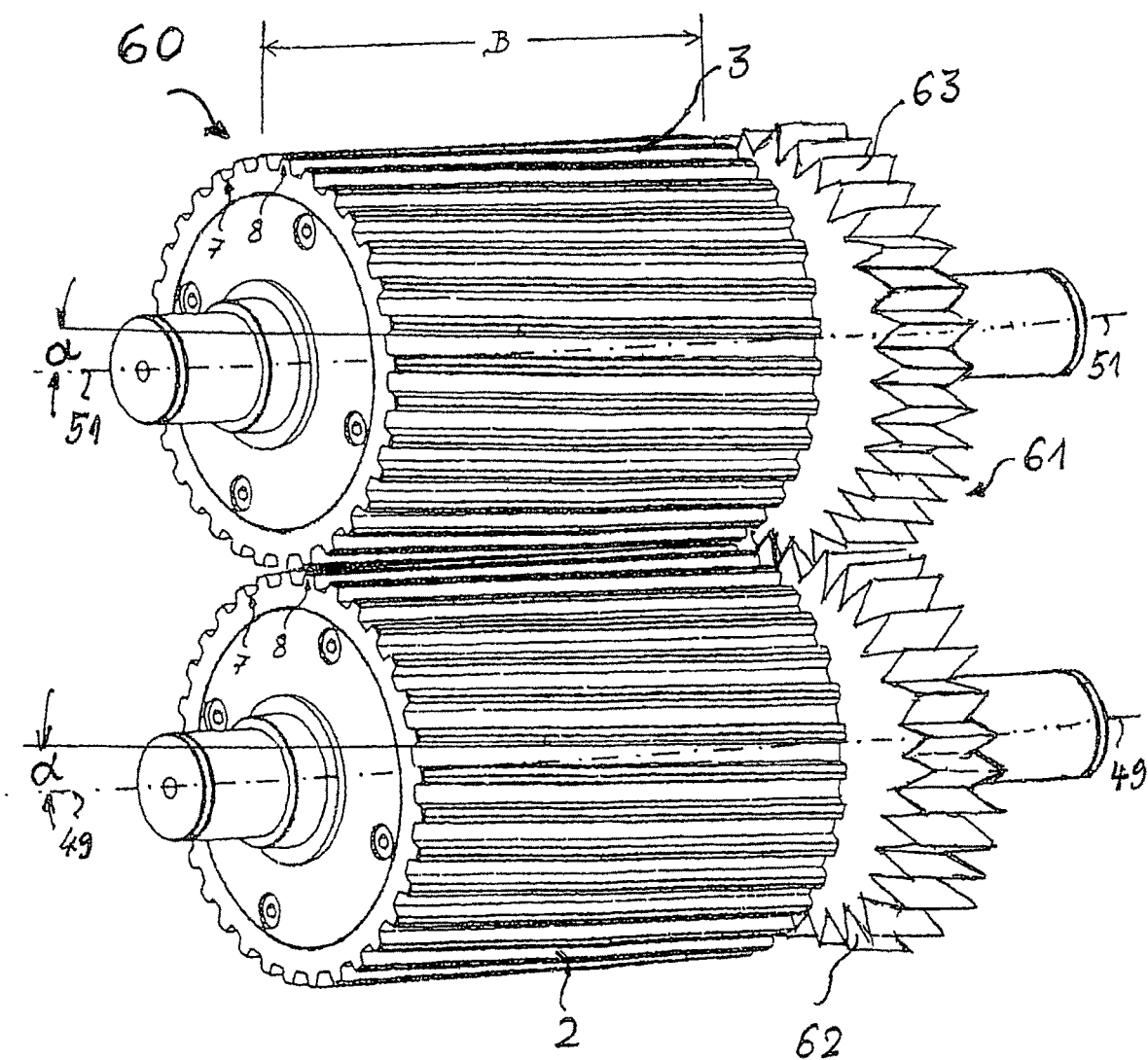
FIG. 3 shows a schematic perspective view of a squeezing roller pair of the squeezing granulator.

FIG. 3 shows a schematic perspective view of a squeezing roller pair 60 of the squeezing granulator shown in FIGS. 1 and 2. The width B of the squeezing roller pair 60 is dimensioned so that a plurality of plastic strands can be simultaneously processed in parallel to produce granulate cushions. The teeth 4 of the squeezing rollers 2 and 3 are embodied in the form of helical gearing with a so-called helix angle α relative to the orientation of the squeezing roller axes 49 and 51.

In this exemplary embodiment, an exact synchronization of the rotation of the rollers 2 and 3 is achieved by means of a synchronizing device 61 that has a first synchronizing gear 62 that rotates together with the roller axis 49 of roller 2 and a second synchronizing gear 63 that rotates together with the roller axis 51 of roller 3 and the synchronizing gears 62 and 63 are dimensioned and positioned so that they mesh with each other.

If the minimum distance a of the rollers from each other were to be changed, then in the schematic depiction in FIG. 3, this would also result in a change in the engagement depth in the region of the meshing synchronizing gears 62, 63, which could be compensated to a certain degree, for example by providing the corresponding gears with helical teeth (not visible when embodied as spur gears in the exemplary schematic depiction). It is also conceivable for a synchronizing device to be provided, which could operate by means of toothed belts or synchronized individual drive units (not shown).

Figure 4:
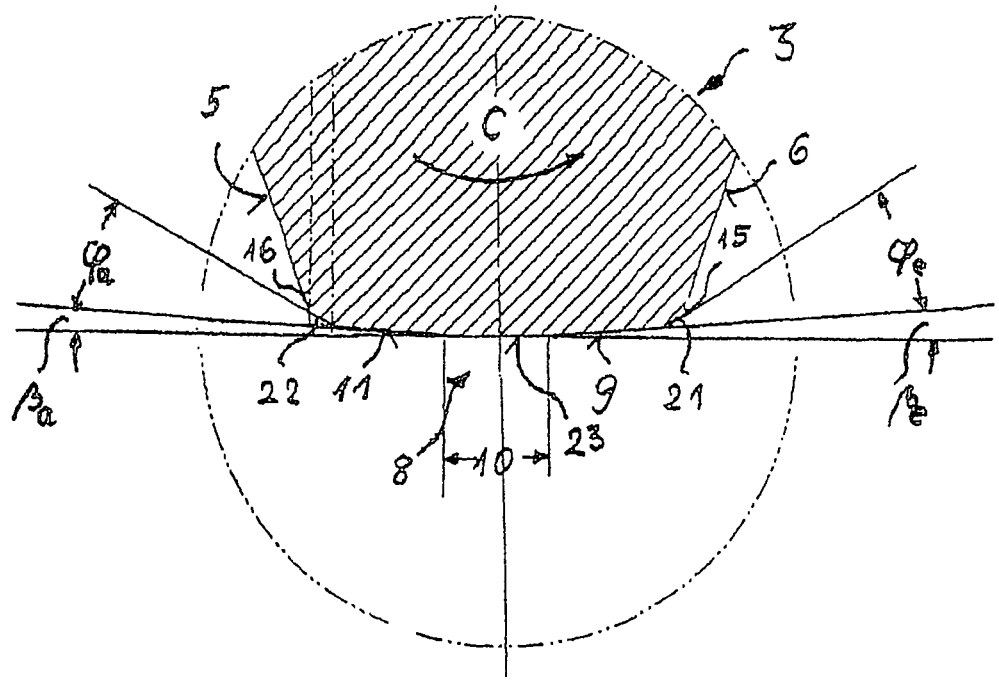
FIG. 4 shows a schematic contour of a tooth tip region of one of the rollers of the squeezing roller pair.

FIG. 4 shows a schematic contour of a tooth tip region of one of the rollers of the squeezing roller pair; the direction of the arrow C depicts the rotation direction, for example, of the squeezing roller 3. The tooth tip region 8 lies between a rising tooth flank 6 that rises in the rotation direction C and a tooth flank 5 that falls in the rotation direction C, both belonging to the teeth 4 of the squeezing roller 3. The incoming squeezing zone 9 begins with an end 15 of the rising tooth flank 6, whose end 15 has a beveled incoming edge 21 with a bevel angle $\varphi_e$. The bevel angle $\varphi_e$ can be between 45° and 15°. The outgoing squeezing zone 11 ends at a beginning 16 of a falling tooth flank 5; the beginning 16 has a beveled outgoing edge 22 with a bevel angle $\varphi_a$ of between 45° and 15°, where $\varphi_e$ and $\varphi_a$ can have different values.

The beveled incoming edges 21 and outgoing edges 22 provide for a gentle squeezing welding of the covering tube during the portioning thereof. Between the incoming squeezing zone 9 and outgoing squeezing zone 11, there is a middle squeezing zone 10 whose flattened region 23 defines a minimum distance from the pressure roller throughout the entire region of the middle squeezing zone 10. The incoming squeezing zone 9 is embodied so that it extends from the incoming edge 21 to the middle squeezing zone 10 so that the distance from the pressure roller gradually decreases. This is achieved in that in this embodiment of the invention, the rising angle $\beta_e$ of the incoming edge 21 until the middle squeezing zone 10 is between 2° and 8°, preferably between 3° and 5°, for the incoming squeezing zone 9. In analogous fashion, starting from the middle squeezing zone 10, the distance from the pressure roller increases in the outgoing squeezing zone 11, for which in this embodiment, the same value is provided for the falling angle $\beta_a$, in this case $\beta_a=\beta_e$, but this is not absolutely necessary.

During the portioning of the covering tube with coextruded filler, the middle squeezing zone 10 with its minimum distance a from the pressure roller constitutes a filler-free intended breaking point profile, which can be fractions of a millimeter or several millimeters thick, depending on the adjustment of the pressing mechanism 47, which is shown in FIG. 2.

Figure 5:
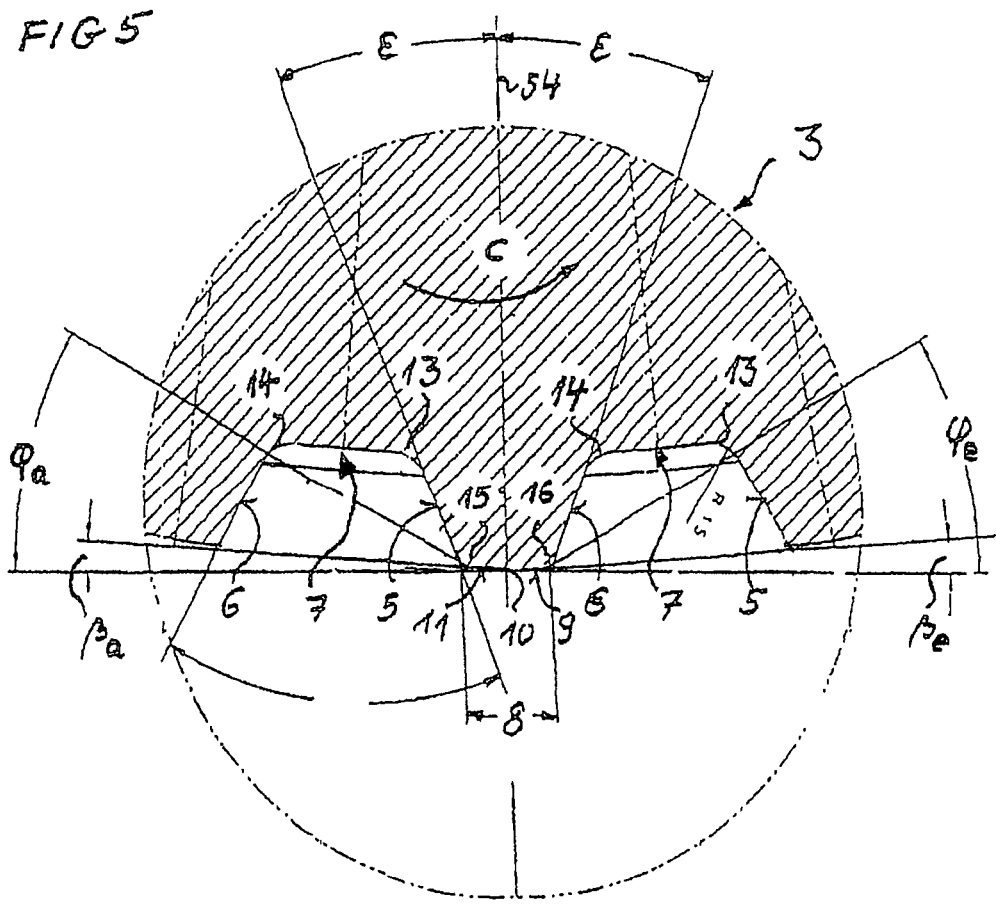
FIG. 5 shows a schematic contour of a tooth root region of one of the rollers of the squeezing roller pair according to FIG. 4.

FIG. 5 shows a schematic contour of a tooth root region of one of the rollers of the squeezing roller pair according to FIG. 4 in the example of the squeezing roller 3 in the vicinity of tooth root regions 7. With a rotation direction extending in the direction of arrow C, such a tooth root region 7 extends from the end 13 of a falling tooth flank 5 to the beginning 14 of a rising tooth flank 6. The tooth root region 7 can have a length of from several millimeters to a few centimeters and lies between a falling tooth flank and a rising tooth flank, 5 and 6, respectively. In addition, a radius of 1 mm to 3 mm is provided in the region of the end 13 of the falling tooth flank 5 and in the region of the beginning 14 of the rising tooth flank 6 in order to avoid microcracks due to the notch effect of transitions between the tooth flanks 5 and 6 and the tooth root region 7.

With the center line 54 of the tooth tip region 8, the tooth flanks form a flank angle $\varepsilon$, which can be between 10° and 35°, preferably between 15° and 25°. The contour of the tooth root region 7 with the contour of the rising and falling tooth flanks 5 and 6, respectively, in cooperation with the cylindrical surface of the pressure roller, constitutes the maximum possible cross-section of a granulate cushion that the squeezing granulator can produce from an outer covering that is filled with a filler material.

The middle squeezing zone 10, which in this embodiment shown in FIGS. 4 and 5 is spaced uniformly apart from the pressure roller, will now be varied in the different embodiments that are shown in FIGS. 6 through 8.

FIG. 6 schematically depicts an alternative contour of a tooth tip region 8 of one of the rollers of the squeezing roller pair in the example of the squeezing roller 3. Components with the same functions as those in FIGS. 4 and 5 are provided with the same reference numerals and are not discussed in particular detail.

The difference from the embodiment according to FIGS. 4 and 5 lies in the fact that in FIG. 6, the middle squeezing zone has a rib cross-section 25 that protrudes beyond the level of the incoming squeezing zone 9 and outgoing squeezing zone 11 and thus defines a minimum distance from the cylindrical surface of the pressure roller. As before, this rib cross-section 25 of the middle squeezing zone can crimp an intended breaking point profile into the covering tube or can even be embodied so that it constitutes a cutting blade that detaches the granulate cushions from one another.

FIG. 7 shows another modification of the contour of the tooth tip region 8 of one of the rollers of the squeezing roller pair in the example of the squeezing roller 3. While both a slightly modified incoming squeezing zone 9 and an outgoing squeezing zone 11 are provided, the middle squeezing zone 10 of the tooth tip region 8 is provided with a sharp step 24 at the transition from the incoming squeezing zone 9 to the middle squeezing zone 10. This sharp step 24 is likewise able to achieve anywhere from a highly effective intended breaking point profile to a shearing-off of the granulate cushions. In this embodiment, the outgoing squeezing zone 11 can be elongated in comparison to the incoming squeezing zone 9.

Preferably then, the contours of the corresponding zones of the mating roller (not shown here) would then be reciprocally embodied in a correspondingly modified fashion.

FIG. 8 shows another modification of the contour of the tooth tip region of one of the rollers of the squeezing roller pair in the example of the squeezing roller 3 in which, in a fashion similar to the one shown in FIG. 7, a sharp step 24 is provided in the middle squeezing zone 10, but with the difference from the embodiment shown in FIG. 7 being that this step 24 is situated at the transition from the middle squeezing zone 10 to the outgoing squeezing zone 11. In this embodiment, the incoming squeezing zone 9 can be elongated relative to the outgoing squeezing zone 11.

FIGS. 9a-9f show production phases in a tooth tip region 8 of a squeezing roller pair 60 composed of a toothed pressure roller 2 and a toothed squeezing roller 3. The pressure roller 2 has a toothed surface 36, which has tooth tip regions and a hardened metal alloy or a hard metal coating or ceramic coating 53. The tooth tip regions 8, 8', and 8" of the squeezing roller 3 are also preferably surface-hardened by means of an inductive hardening process.

The nip that is formed by a minimum distance a between the tooth tip region of the pressure roller 2 and the tooth tip region of the squeezing roller 3, as shown in FIG. 9a, draws in the beginning of a covering tube 18 with a filler 19, thus forming a first media-tight incoming squeezing seam 55 of a granulate cushion that is to be produced. In this case, the covering tube 18 with the filler 19 in FIG. 9b is grasped by a subsequent tooth tip region 8' of the teeth 4 of at least the squeezing roller 3.

As shown in FIG. 9c, the covering tube 18 is increasingly compressed, thus pressing the filler 19 into the cavity between the root regions of the teeth of the two rollers 2 and 3 of the squeezing roller pair 60, forming an outer covering that encloses the filler 19. In FIG. 9d, the incoming squeezing zone 9 of the subsequent tooth tip region 8' is finally reached and a first end squeezing seam 56 for a first granulate cushion 12 is produced in the incoming squeezing zone 9.

In FIG. 9e, the minimum distance a, as shown in FIG. 9a, between the subsequent tooth tip region 8' and the cylindrical surface 36 of the pressure roller 2 is reached by the middle squeezing zone 10 of the tooth tip region 8', thus producing an intended breaking point profile. As the squeezing rollers 2 and 3 synchronously rotate farther in the direction of the arrow C, the tooth tip region 8' travels into the outgoing squeezing zone 11, which then in FIG. 9f, produces a media-tight second incoming squeezing seam 55' for a subsequent granulate cushion 12' by means of welding.

In the phase shown in FIG. 9f, between the root regions of the teeth of the two rollers 2 and 3 of the squeezing roller pair 60 and the contour composed of the tooth flanks 5 and 6 and the tooth root region 7' of the rollers 2 and 3, the contour of the granulate cushion 12' is then produced, which then fills almost the entire space between the root regions of the teeth of the two rollers 2 and 3 of the squeezing roller pair 60.

Since the width of the granulate cushions 12 is less than the width B of the squeezing roller pair 60, as shown in FIG. 3, a plurality of covering tubes 18, namely up to N covering tubes, where N<2B/πd, can be positioned simultaneously next to and parallel to one another between the squeezing roller pair 60, where d is the outer diameter of the covering tube. It is thus possible to significantly multiply the output of the squeezing granulator according to the invention.

Although at least exemplary embodiments have been demonstrated in the above description, various changes and modifications can be carried out. The embodiments mentioned are only examples and are not provided to restrict the scope of validity, the applicability, or the configuration of the squeezing roller granulator in any way. Instead, the above description provides the person skilled in the art with a plan for implementing at least one exemplary embodiment of the squeezing roller granulator; numerous changes in the function and design of the squeezing roller granulator can be made in components of the squeezing roller granulator described in the exemplary embodiments without departing from the scope of protection of the attached claims and their legal equivalents.

REFERENCE NUMERAL LIST

1 squeezing granulator
2 pressure roller
3 toothed squeezing roller
4 teeth
5 tooth flank (falling)
6 tooth flank (rising)
7, 7', 7" tooth root region
8, 8', 8" tooth tip region
9 incoming squeezing zone
10 middle squeezing zone
11 outgoing squeezing zone
12 granulate cushion
13 end of a falling tooth flank
14 beginning of a rising tooth flank
15 end of a rising tooth flank
16 beginning of a falling tooth flank
17 feeder device
18 covering tube
19 filler
21 incoming edge with bevel
22 outgoing edge with bevel
23 flattened region
24 step
25 rib cross-section
26 helical gearing
27 extrusion device
28 plastic strand
29 collecting device
30 control and regulating unit
31 drive unit of the squeezing roller
32 temperature adjusting device
33 water bath
34 drying device
35 supply path
36 cylindrical surface
37 heat exchanger
38 pump
39 motor
40 coextrusion nozzle
41 annular gap of the coextrusion nozzle
42 center of the coextrusion nozzle
43 water outlet
44 return line
45 upper housing half
46 lower housing half
47 pressing mechanism
48 hydraulic or pneumatic cylinder
49 axis of the pressure roller
51 axis of the squeezing roller
52 water jet nozzle
53 ceramic coating
54 center line
55, 55' incoming squeezing seam of a granulate cushion
56, 56' end squeezing seam of a granulate cushion
60 squeezing roller pair
61 synchronizing device
62 synchronizing gear
63 synchronizing gear
100 granulation system
$\alpha$ helix angle or helical gearing angle
$\beta$ rising angle
$\varphi$ bevel angle
$\varepsilon$ flank angle
a minimum distance from the pressure roller
B width of the squeezing roller
d outer diameter of the tooth root region
D outer diameter of the tooth tip region of the squeezing roller
L length of the granulate cushion
n number of teeth of the squeezing roller
N number of covery tubes

The invention claimed is:

1. A squeezing roller granulator comprising
a squeezing roller pair including a toothed pressure roller and a toothed squeezing roller, in which teeth of the toothed pressure roller and the toothed squeezing roller have tooth flanks that are situated between a tooth root region and a tooth tip region;

the tooth root region has an outer diameter that is smaller than an outer diameter of the tooth tip region;

the tooth tip region of at least one of the rollers of the squeezing roller pair has three squeezing zones including a middle squeezing zone, at least two of the three squeezing zones define different distances between the tooth tip regions of the squeezing roller pair with a minimum distance in the middle squeezing zone and wherein the tooth tip regions of the squeezing roller pair are situated opposite one another during a squeezing procedure such that the squeezing roller pair are synchronized; and a contour of the tooth flanks and the tooth root region of the rollers of the squeezing roller pair defines a maximum cross-section of granulate cushions to be formed;

for the at least one of the rollers of the squeezing roller pair, the tooth root region extends from an end of a falling tooth flank to a beginning of a rising tooth flank and the tooth tip region extends from an end of the rising tooth flank to a beginning of the falling tooth flank;

the three squeezing zones of the tooth tip region have an incoming squeezing zone that is situated toward an infeed side, an outgoing squeezing zone that is situated toward an outflow side, and the middle squeezing zone, which is situated between the incoming and outgoing squeezing zones;

the incoming and outgoing squeezing zones of the teeth are delimited by the tooth flanks;

the incoming squeezing zone defines a distance from the toothed pressure roller that decreases toward the middle squeezing zone; and the outgoing squeezing zone defines a distance between the rollers of the squeezing roller pair that increases leading away from the middle squeezing zone;

wherein an incoming squeezing zone is embodied to produce an incoming sealing seam of the granulate cushions;

an outgoing squeezing zone is embodied to produce an outgoing sealing seam of the granulate cushions;

wherein the middle squeezing zone of the tooth tip region has a flattened region or step serving as the intended breaking point profile or a rib cross-section that protrudes beyond an incoming squeezing zone and an outgoing squeezing zone;

wherein arrangement of the tooth tip regions of the squeezing roller pair causes the middle squeezing zone of the squeezing roller pair to create an intended breaking point seam between the granulate cushions;

the squeezing roller granulator configured to be fed a strand which is pre-filled with a filler material so that the contour of the squeezing roller granulator squeezes the pre-filled filler material of the strand into granulate cushions, the squeezing deforming the strand and its pre-filled filler material to match a shape of the contour;

wherein both rollers of the squeezing roller pair have a helical gearing with helical gearing angle α between arc tan $\pi D/nB \le \alpha \le 5$ arc tan $\pi D/nB$, where D is the outer diameter of the rollers, B is the width of the rollers, and n is the number of teeth distributed over the outer circumference of the rollers.

2. The squeezing roller granulator according to claim 1, wherein only one of the two rollers of the squeezing roller pair has the three squeezing zones in the tooth tip region, whereas the other one of the two rollers of the squeezing roller pair has a smooth, cylindrically rounded tooth tip region.

3. The squeezing roller granulator according to claim 2 wherein the covering tube contains thermoplastic plastics from the group consisting of polyamide, polypropylene, low-density polyethylene, ethylene-vinyl alcohol copolymer, ethylene-vinyl acetate copolymer and mixed products thereof with percentages of polyolefin waxes, polyethylene waxes, polypropylene waxes, or fatty acid derivatives.

4. The squeezing roller granulator according to claim 1, wherein the two rollers of the squeezing roller pair have the three squeezing zones in their tooth tip regions.

5. The squeezing roller granulator according to claim 1 further comprising: a synchronizing device which synchronizes rotation of the squeezing roller pair so that the tooth tip regions are situated opposite one another during the squeezing procedure.

6. The squeezing roller granulator according to claim 1 wherein the squeezing roller granulator further comprises a feeder device which comprises an extruded, the feeder device configured to feed the strand which is a covering tube with coextruded filler, and the granulate cushions contain portions of the filler, which are enclosed by an outer covering composed of the material of the covering tube.

7. The squeezing roller granulator according to claim 1 wherein the outgoing squeezing zone is longer than the incoming squeezing zone.

8. The squeezing roller granulator according to claim 1 wherein the toothed squeezing roller and the toothed pressure roller have a metal alloy and the tooth tip regions of the toothed pressure roller and the toothed squeezing roller have wear-resistant surfaces.

9. The squeezing roller granulator according to claim 8 wherein the squeezing roller and the pressure roller include a metal alloy.

10. The squeezing roller granulator according to claim 8 wherein the squeezing roller and the pressure roller have a metal alloy and the tooth tip regions of the pressure roller and the squeezing roller have surfaces with metal coatings or ceramic coatings.

11. The squeezing roller granulator according to claim 1 wherein the granulate cushion has a length l of $l \le \pi D/n$, where n is a number of teeth distributed over the outer circumference of the squeezing roller and D is the outer diameter of the squeezing roller, and has a width b of $b \le B/N$, where B is the width of the squeezing roller and N is a number of parallel covering tubes with coextruded filler that are supplied to the squeezing roller, such that $N = 2B/\pi d$, where d is an outer diameter of the covering tube.

12. The squeezing roller granulator according to claim 1 further comprising a granulation system having:

an extrusion device for coextruding fillers contained in covering tubes into plastic strands;

a feeder device for supplying the plastic strands to the squeezing roller pair composed of the toothed pressure roller and the toothed squeezing roller;

a collecting device for collecting the plastic strands that have been portioned by the squeezing roller pair into the granulate cushions, which are composed of an outer covering and the pre-portioned filler which is a coextruded filler; and
a controller which coordinates a drive unit of the squeezing roller with an extrusion speed of the plastic strands;
and a synchronizing device which synchronizes the rotation of the squeezing roller pair so that the tooth tip regions are situated opposite one another during a squeezing procedure.

13. The squeezing roller granulator is according to claim 1 is configured to produce granulate cushions with powdered, liquid, viscous, or plastically deformable fillers.

14. The squeezing roller granulator of claim 1 wherein the squeezing roller granulator is configured to portion in pharmaceutical, medicinal, cosmetic, adhesive, or sterile-packed fillers into the granulate cushions with an outer covering.

15. The squeezing roller granulator according to claim 1 wherein the two rollers of the squeezing roller pair have the three squeezing zones in their tooth tip regions and further comprising: a synchronizing device which synchronizes rotation of the squeezing roller pair so that the tooth tip regions are situated opposite one another during a squeezing procedure.

16. A squeezing roller granulator comprising
a squeezing roller pair including a toothed pressure roller and a toothed squeezing roller, in which teeth of the toothed pressure roller and the toothed squeezing roller have tooth flanks that are situated between a tooth root region and a tooth tip region;
both rollers of the squeezing roller pair have a helical gearing with helical gearing angle α between $$\arctan \pi D/nB \leq \alpha \leq 5 \arctan \pi D/nB.$$

where D is the outer diameter of the rollers, B is the width of the rollers, and n is the number of teeth distributed over the outer circumference of the rollers;
the tooth root region has an outer diameter that is smaller than an outer diameter of the tooth tip region;
the tooth tip region of at least one of the rollers of the squeezing roller pair has three squeezing zones including a middle squeezing zone, at least two of the three squeezing zones define different distances between the tooth tip regions of the squeezing roller pair with a minimum distance in the middle squeezing zone and wherein the tooth tip regions of the squeezing roller pair are situated opposite one another during a squeezing procedure such that the squeezing roller pair are synchronized; and
a contour of the tooth flanks and the tooth root region of the rollers of the squeezing roller pair defines a maximum cross-section of granulate cushions to be formed;
the granulate cushion has a length I of $$l \leq \pi D/n,$$

where n is a number of teeth distributed over the outer circumference of the squeezing roller and D is the outer diameter of the squeezing roller, and has a width b of $$b \leq B/N,$$

where B is the width of the squeezing roller and N is a number of parallel covering tubes with coextruded filler that are supplied to the squeezing roller, such that $$N = 2B/\pi d,$$

where d is an outer diameter of the covering tube;
for the at least one of the rollers of the squeezing roller pair, the tooth root region extends from an end of a falling tooth flank to a beginning of a rising tooth flank and the tooth tip region extends from an end of the rising tooth flank to a beginning of the falling tooth flank;
the three squeezing zones of the tooth tip region have an incoming squeezing zone that is situated toward an infeed side, an outgoing squeezing zone that is situated toward an outflow side, and the middle squeezing zone, which is situated between the incoming and outgoing squeezing zones;
the incoming and outgoing squeezing zones of the teeth are delimited by the tooth flanks;
the outgoing squeezing zone is longer than the incoming squeezing zone;
the incoming squeezing zone defines a distance from the toothed pressure roller that decreases toward the middle squeezing zone; and
the outgoing squeezing zone defines a distance between the rollers of the squeezing roller pair that increases leading away from the middle squeezing zone;
wherein arrangement of the tooth tip regions of the squeezing roller pair causes the middle squeezing zone of the squeezing roller pair to create an intended breaking point seam between the granulate cushions;
the squeezing roller granulator configured to be fed a strand which is pre-filled with a filler material so that the contour of the squeezing roller granulator squeezes the pre-filled filler material of the strand into granulate cushions, the squeezing deforming the strand and its pre-filled filler material to match a shape of the contour.

17. The squeezing roller granulator according to claim 16, wherein the outgoing squeezing zone is longer than the incoming squeezing zone.

* * * * *